UNITED STATES PATENT OFFICE.

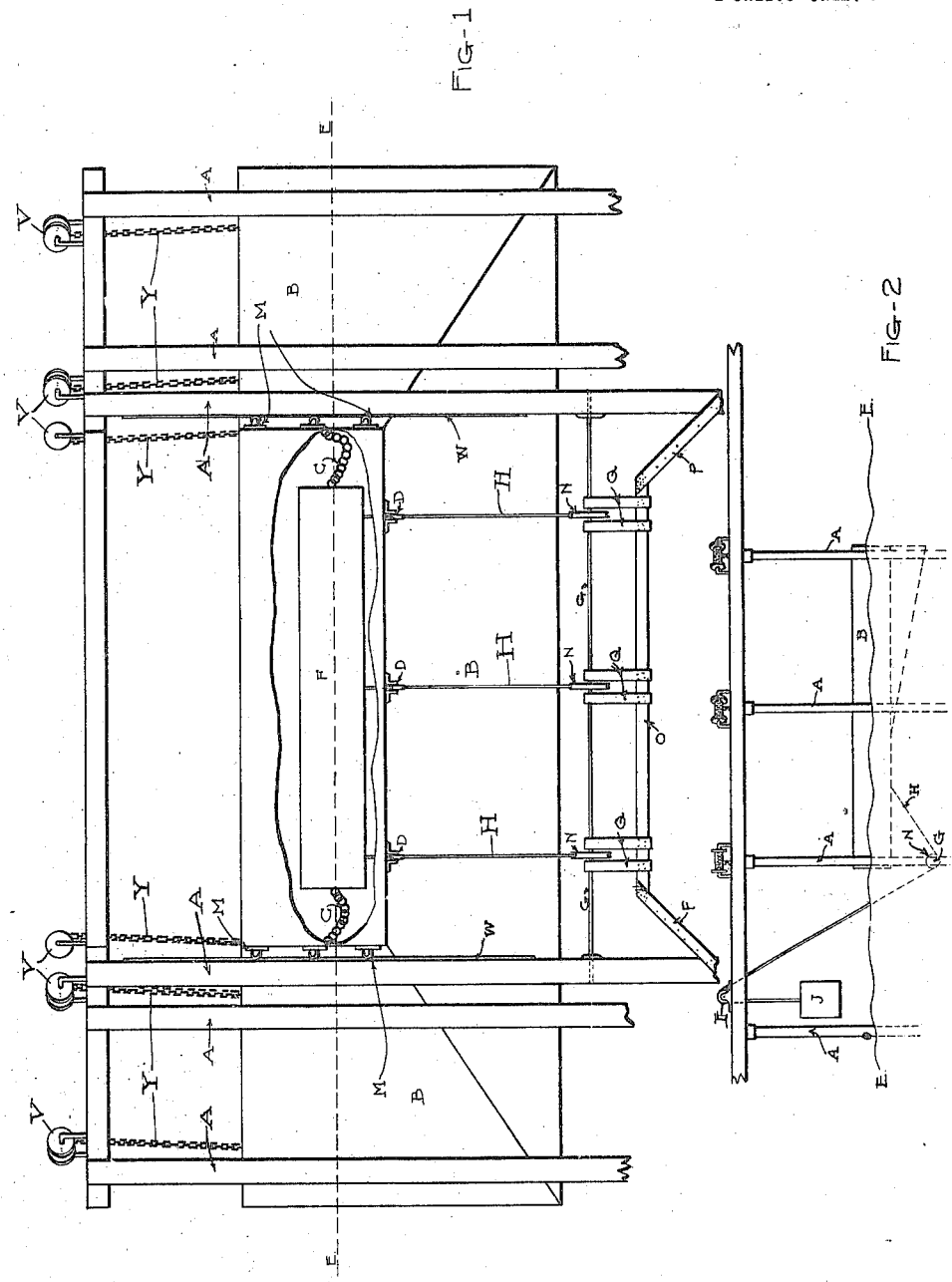

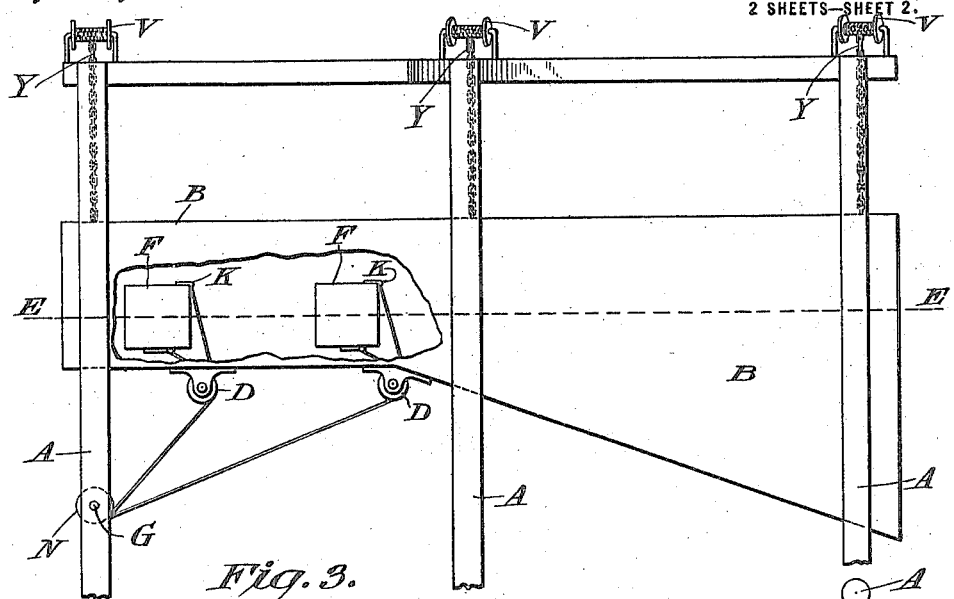
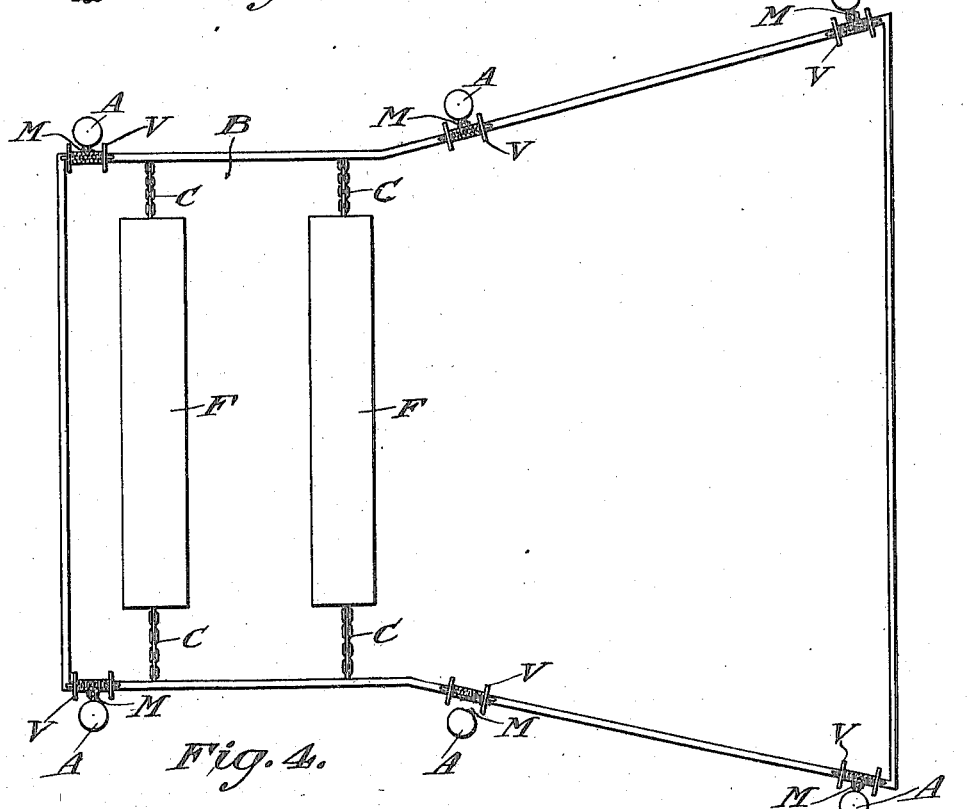

DONUIL HILLIS, OF LOS ANGELES, CALIFORNIA.

WAVE-MOTOR.

1,263,890.

Specification of Letters Patent.  Patented Apr. 23, 1918.

Application filed February 14, 1917. Serial No. 148,578.

*To all whom it may concern:*

Be it known that I, DONUIL HILLIS, a citizen of the United States, residing at 728 So. New Hampshire ave., in Los Angeles, in the county of Los Angeles, in the State of California, have invented Wave-Motors, of which the following is a specification.

The wave motor illustrated and described in the following pages is intended to convert the energy of the ocean waves into electricity by the use of floats and a special device to increase the rise and fall of the waves thus making them more effective.

Figure No. 1 of the drawings is an end elevation showing a rear wall, side walls and inclined plane of the apparatus for increasing the rise and fall of the waves. It also shows parts broken away to show the position of one of the floats in the water.

Fig. No. 2 is a side elevation of the apparatus (not in detail) showing the means by which the power is transmitted to a wharf where the power may be converted into electricity.

Fig. No. 3 is a side elevation with parts broken away, of floats and apparatus for increasing the rise and fall of the waves.

Fig. No. 4 is a plan view of the floats and the before mentioned apparatus.

The wave motor illustrated in the accompanying drawings consists of a fan-shaped box-like structure "B", floats "F" inclosed by this structure and some auxiliary apparatus for the purpose of transmitting the power developed by the floats to electric generators and for adjusting the box-like structure.

Piling "A" stands in the water far enough off shore to be beyond the surf. A box-like structure "B" is supported by the piling, being vertically adjustable therein by means of wheels "M" and grooved tracks "W". A beam "O" supported by braces "P" bears uprights "Q" by which an axle "G" is supported. Inclosed within the structure "B" is a plurality of floats "F". Cables "H" attached to floats "F" pass through apertures in the bottom of the structure "B" and over pulleys "D", "N" and drum "I" with ratchet attachment, mounted on the structure "B", the axle "G" and the supporting framework, respectively, and are provided with the counterweight "J". Guy chains "C" fasten the floats "F" to the structure "B". "E" indicates the water level. Chains "Y" are attached to the top of the structure "B" and hand windlasses "V". "K" indicates cable fastenings on the floats "F".

A wave enters the lower end of the box-like structure, ascends the inclined floor, piles up against the rear wall, raises the floats "F" and then returns seaward allowing the floats to fall. The energy created by the upward thrust of the floats is transmitted to the shore through cable H.

"B", the inclined plane apparatus also increases the power of the waves by concentrating their force. The side walls of "B" are shown converging and are connected by the rear wall which is opposite the open end. The wave enters the inclined plane apparatus at the open end and its force is deflected toward the floats "F". By virtue of its kinetic energy the wave will crowd between the walls adjacent to the floats. Because of the fact that there is behind it the kinetic energy of a wave of its former width and because this energy finally acts upon a smaller area of water, the wave will pile up in the small inclosure higher than it would if it were allowed to move unobstructed. The floats "F" rise with the wave and fall as it returns seaward. Four chains "C" limit the movement of the floats just enough to prevent them from contacting with the adjacent walls. The inclined plane apparatus "B" always has the same draft. When the tide rises the apparatus rises with it. When the tide falls windlasses "V" worked by hand pay out enough chain "Y", so that it may fall. The chains merely prevent it from sinking as it otherwise would in the instant that it supports the weight of water it pens above the regular water level.

The inclined plane apparatus has no horizontal motion. The stationary vertical tracks that it moves in, prevent any but vertical motion.

I claim:

In a wave motor the combination of a vertically adjustable open-ended box-like structure having an inclined bottom whereby the force of the waves is concentrated and a float or floats positioned therein so as to be acted on by the waves.

In testimony whereof I have hereunto set my hand at Los Angeles this 18th day of January 1917.

DONUIL HILLIS.

Witnesses:
ARTHUR CRUM,
ROBERT HARRISON.

Copies of this patent may be obtained for five cents each, by addressing the "Commissioner of Patents, Washington, D. C."